United States Patent [19]

Sato

[11] Patent Number: 5,031,930
[45] Date of Patent: Jul. 16, 1991

[54] AIR BAG SYSTEM

[75] Inventor: Takeshi Sato, Shiga, Japan

[73] Assignee: Takata Corporation, Tokyo, Japan

[21] Appl. No.: 547,239

[22] Filed: Jul. 3, 1990

[30] Foreign Application Priority Data

Jul. 18, 1989 [JP] Japan .................................. 1-185570

[51] Int. Cl.⁵ .............................................. B60R 21/16
[52] U.S. Cl. ...................................... 280/732; 280/743
[58] Field of Search ............... 280/728, 732, 743, 752; 180/90, 271

[56] References Cited

U.S. PATENT DOCUMENTS

| 3,708,179 | 1/1973 | Hulten | 280/732 |
| 4,842,299 | 6/1989 | Okamura et al. | 280/732 |
| 4,893,833 | 1/1990 | DiSalvo et al. | 280/732 |
| 4,925,209 | 5/1990 | Sakurai | 280/732 |

FOREIGN PATENT DOCUMENTS 1320459  6/1973  United Kingdom .

Primary Examiner—Charles A. Marmor
Assistant Examiner—Tamara L. Finlay
Attorney, Agent, or Firm—Kanesaka and Takeuchi

[57] ABSTRACT

An air bag system comprises a module cover door disposed generally flush with an instrument panel of a vehicle and an air bag and an inflater disposed at the back of the module cover door, wherein a mounted portion of the module cover door for allowing the module cover door to be opened into a compartment of the vehicle by expansion of the air bag is disposed at one side of the module cover door to extend rearwardly the frontal face of the module cover door. The mounted portion of the module cover door includes slots extending toward the inside of the compartment and mounting members inserted into the slots for mounting the module cover door on the vehicular body.

6 Claims, 3 Drawing Sheets

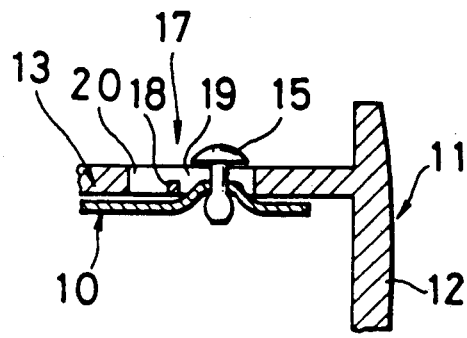
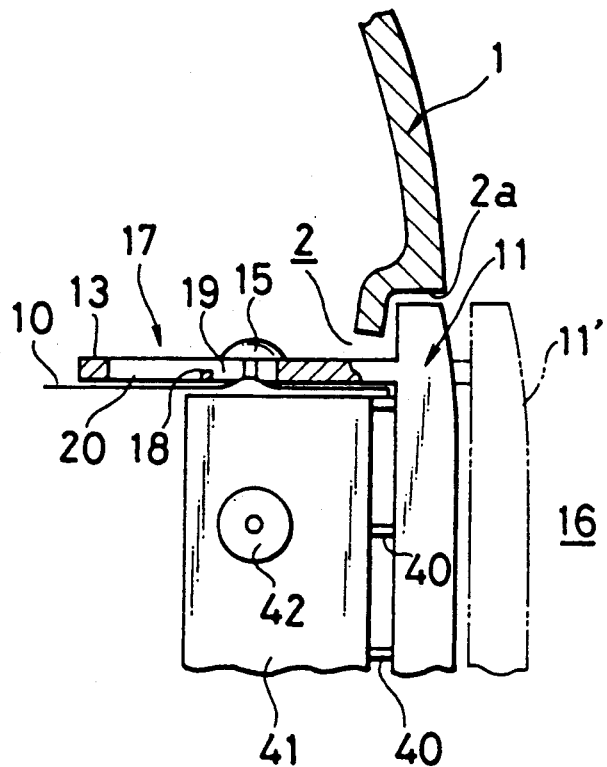
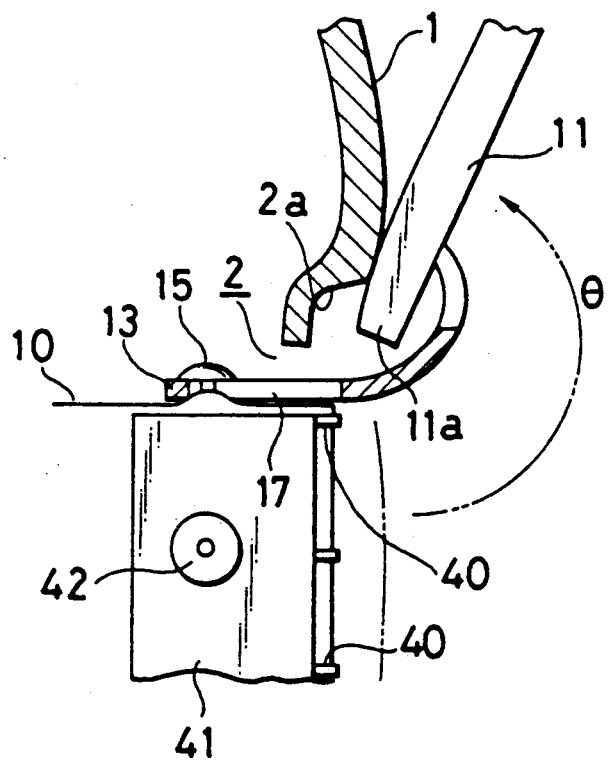

5,031,930

AIR BAG SYSTEM

FIELD OF THE INVENTION AND RELATED ART STATEMENT

The present invention relates to an air bag system which is attached to a vehicle so that it may be inflated at the time of a vehicular crash to protect a passenger. More particularly, the present invention relates to an air bag system which is improved to facilitate opening of a module cover door disposed flush with an instrument panel of the vehicle.

Before entering into a detailed description of the above kind of the air bag system, a cursory review will be made on the conventional structure of the air bag system with reference to FIGS. 5 and 6. As shown in FIG. 5, the instrument panel 1 of a vehicle such as a car is formed with an opening 2, to which is attached a module cover door 3 for opening or closing the opening 2. At the back of the module cover door 3, there are confined an air bag and an inflater (although both of them are not shown). The module cover door 3 has a free side fastened to the car body by means of bolts 5 so that its frontal face may be flush in a normal state with the surface of the instrument panel 1. Moreover, the opposite side of the module cover door 3 is so attached to the instrument panel 1 that it may be opened, as shown, into a compartment of a car when the air bag is inflated, to allow the air bag to bulge through the opening 2 into the compartment.

Here, reference numeral 4 designates an openable door for opening a glove box which is disposed in the instrument panel 1 to accommodate small articles.

FIG. 6 is a sectional view schematically showing one example of the engaging relation between the instrument panel 1 and the module cover door 3 according to the prior art. At the back of the module cover door 3, as shown in FIG. 6, a mounted portion 3b extends from a frontal face 3a, which is fixed to a container 7 of the air bag system by means of rivets 6.

At the time of inflating the air bag, the module cover door 3 is opened into the compartment, as indicated by double-dotted lines in FIG. 6. Then, the module cover door 3 abuts at its edge portion against the edge portion 2a of the opening 2 of the instrument panel 1. As a result, a relatively high force is required to open the module cover door 3 so that the output of the inflater has to be large. This inevitably boosts the internal pressure of the air bag to cause a drawback that expansion of the air bag, toward the driver or passenger grows excessive after inflation.

OBJECTS AND SUMMARY OF THE INVENTION

An object of the present invention is to provide an air bag system which can be easily inflated over a wide range of the compartment.

Another object of the present invention is to provide an air bag system which has a module cover door reliably held in the car body even when the air bag is inflated.

Still another object of the present invention is to provide an air bag system which is improved to eliminate the drawback of excessive expansion of the air bag toward the driver or passenger after inflation by so-called "soft inflation", by which the air bag can be inflated under a low internal pressure.

According to the present invention, there is provided an improved air bag system which comprises: a module cover door disposed generally flush with an instrument panel of a vehicle; and an air bag and an inflater disposed at the back of the module cover door, wherein a mounted portion of the module cover door for allowing the module cover door to be opened into the compartment of the vehicle by expansion of the air bag is disposed at one side of the module cover door and retracted from a frontal face of the module cover door.

The air bag system of the present invention is further improved in that the mounted portion of the module cover door includes: slots extending toward the inside of the compartment; and mounting members inserted into said slots for mounting the module cover door on the vehicular body.

In the present invention, each of these slots may be divided by a partition into a hole at the side of the vehicular compartment and a hole at the opposite side.

In the air bag system of the present invention, the module cover door is moved in its entirety into the compartment by pushing force which is applied toward the compartment from the air bag by the module cover door at the beginning of the expansion of the air bag. This movement is caused by the movement of the slotted portions of the mounted portions along the mounting members.

When the module cover door is thus moved in its entirety into the compartment, it is opened such that the front edge portion does not abut against the peripheral edge of the opening of the instrument panel. As a result, resistance against the expansion of the air bag is reduced so that the air bag can be smoothly inflated even if the output of the inflater is low.

With the slots thus formed, moreover, the module cover door can be easily positioned when it is mounted.

BRIEF DESCRIPTION OF THE DRAWINGS

FIG. 2 is a section view taken along line II—II of FIG. 1;

FIGS. 3 and 4 are partially sectional views for explaining the operations of the air bag system of FIGS. 1 and 2.

DESCRIPTION OF THE PREFERRED EMBODIMENT

The present invention will be described in the following in connection with the embodiments thereof with reference to the accompanying drawings.

Figure 1:
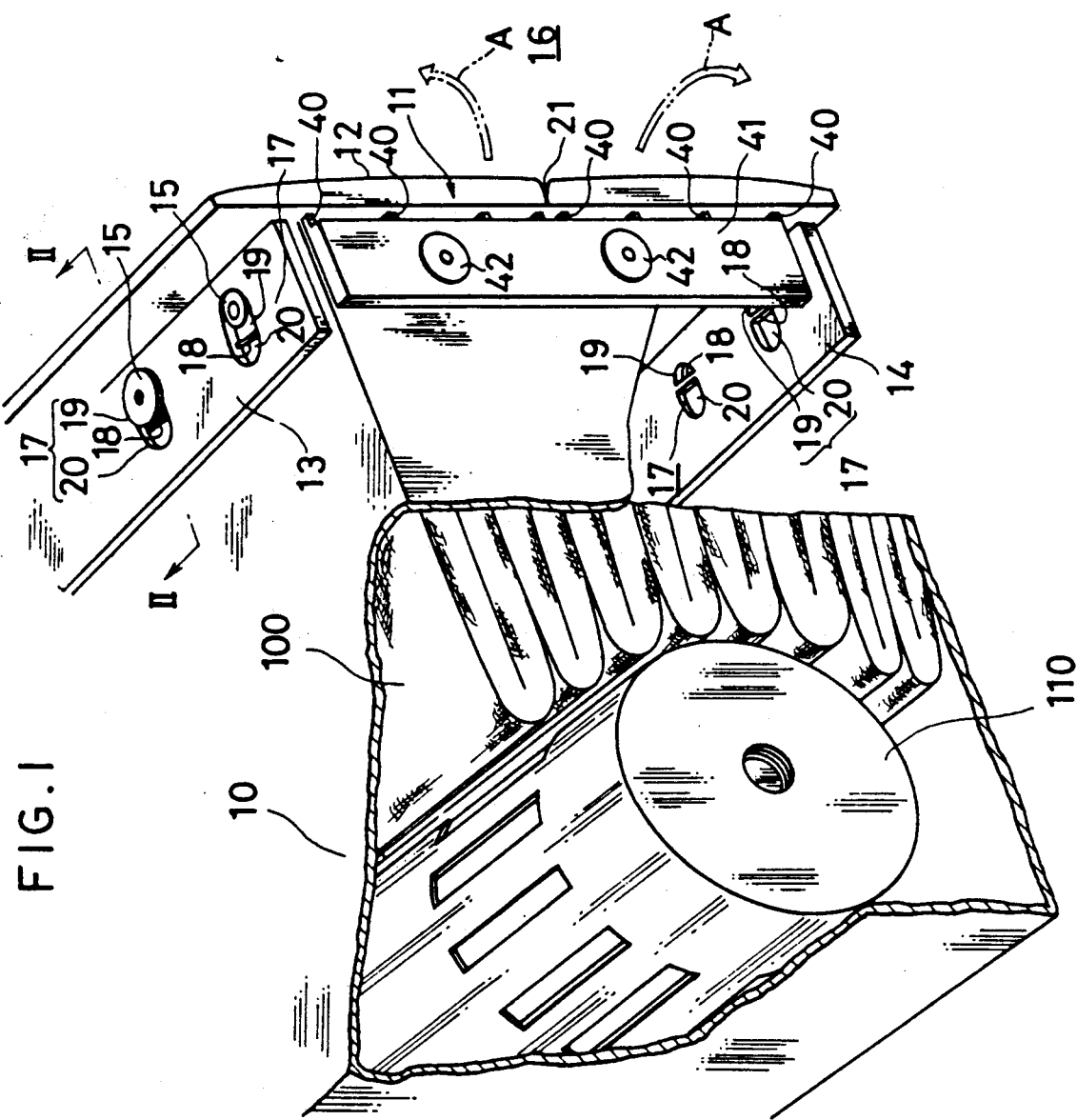
FIG. 1 is a perspective view showing an air bag system according to an embodiment of the present invention.

FIG. 1 is a perspective view showing an air bag system according to an embodiment of the present invention, and FIG. 2 is a section taken along line II—II of FIG. 1. FIGS. 3 and 4 are partially sectional views for explaining the operations, of which FIG. 3 shows a state before expansion whereas FIG. 4 shows a state after expansion.

In a container 10 of the air bag system, there are confined an air bag 100 and an inflater 110. To the frontal face of the container 10, there is attached a module cover door 11 which is made of a synthetic resin. This module cover door 11 is positioned to have its frontal face 12 flush with the surface of an instrument panel 1

(as shown in FIG. 3). The module cover door 11 is formed at its upper and lower side with shelf-shaped mounted portions 13 and 14 which are extended backward from the frontal face 12, and are attached to outer faces of the container 10 by means of blind rivets 15. Each of the mounted portions 13 and 14 is formed with a plurality of slots 17 which are elongated toward the compartment 16 of the vehicle and which are arranged at a predetermined spacing. In the present embodiment, each slot 17 is divided into two holes 19 and 20 by a partition 18 extending in the transverse direction of the slot 17. The aforementioned rivets 15 are fitted in inner portions of the slots 17, i.e. holes 19 which are located at the sides nearer the compartment 16 than the partitions 18.

The module cover door 11 is integrally equipped at its sides with plates 41 through a plurality of thin pins 40. The plates 41 are fixed to the sides of the container 10 by means of rivets 42.

With the air bag system thus constructed, the inflater is operated to inflate the air bag at the time of a car crash. First of all, a back of the module cover door 11 is pushed into the compartment 16. Then, the module cover door 11 is moved in its entirety into the compartment 16, as indicated by double-dotted lines 11' in FIG. 3. At this time, the thin pins 40 are broken to allow the door 11 to move separately from the plate 41 and into the compartment 16. As the door 11 is thus moved, the blind rivets 15 break the partitions 18 and come to be located in the holes 20. After this, the expanding force of the air bag further acts upon the module cover door 11. Then, the module cover door 11 is broken and opened along its central slit 21 and is deformed and opened such that the mounted portions 13 and 14 curve, as indicated by arrows A in FIG. 1 and shown in FIG. 4, so that the air bag expands into the compartment 16.

When the module cover door 11 is opened, an edge portion 11a of the door 11 is not brought into contact with the edge 2a of the opening 2 of the instrument panel 1 as shown in FIG. 4, so that it is subjected to a very small deforming resistance of the door 11. Since, moreover, the angle θ of opening of the module cover door 11 is very large, the air bag is allowed to expand easily over a wide range in the compartment. Since, still moreover, the mounted portions 13 and 14 are not subjected to locally large deformations, the module cover door 11 can be held without fail at the compartment side even when it is opened.

Here, the slots 17 are equipped with the partitions 18 in the present embodiment so that the positioning of the module cover door 11 can be facilitated when door 11 is to be mounted.

Figure 5:
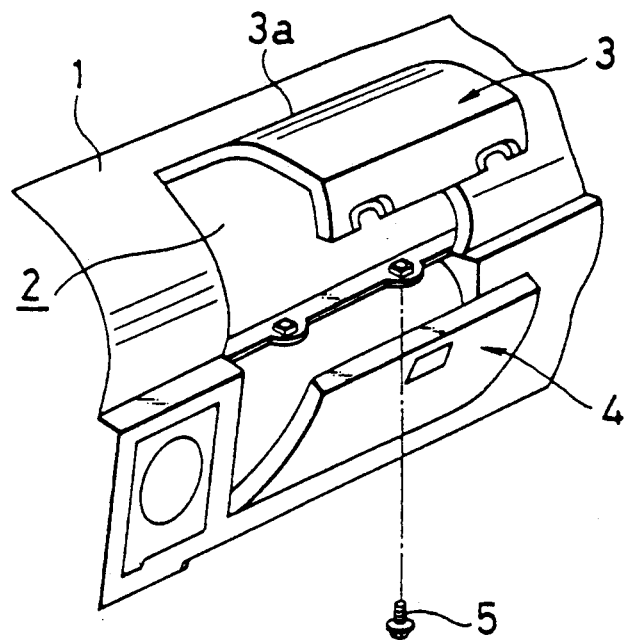
FIGS. 5 and 6 are a perspective view and a partially sectional view showing an example of the air bag system of the prior art.
Figure 6:
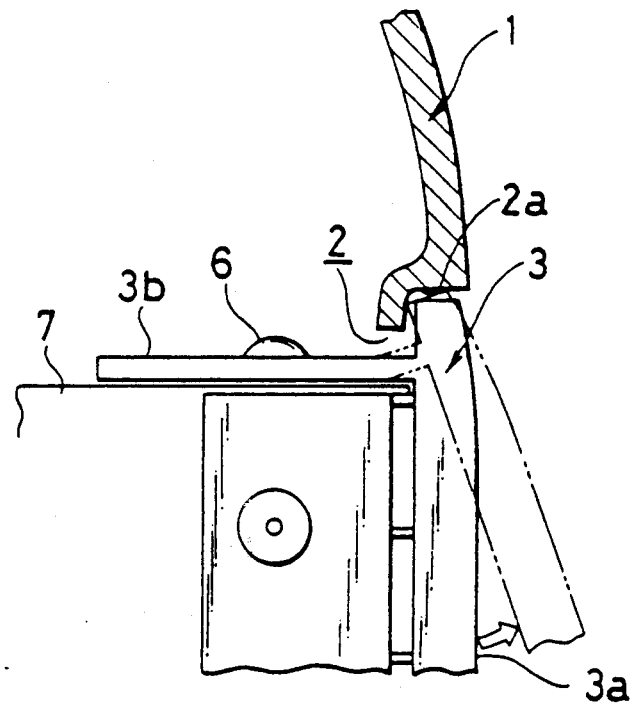

In the present embodiment, the module cover door is broken and opened along the slit 21. Despite of this structure, however, the module cover door may be modified such that free ends are released from their restraints by the pressure of the air bag to open the module cover door as shown in FIG. 5.

In the air bag system of the present invention, as has been described hereinbefore, the module cover door is not opened when the air bag expands, until it once advances into the compartment. As a result, the angle of opening of the module cover door is enlarged to facilitate the expansion of the air bag over a wide range of the inside of the compartment. Moreover, the module cover door is held without fail at the side of the car body even when the air bag expands. Still moreover, the soft inflation, in which the air bag expands under a low internal pressure, can be effected to eliminate the drawback that the expansion of the inflated air bag toward the driver or passenger becomes excessive.

Incidentally, the positioning of the module cover door to be mounted is facilitated because the slots of the mounted portions of the cover door are partitioned.

What is claimed is:
1. An air bag system comprising;
   a box-shaped container having an open face and attached to a vehicle to have said open face facing inside of a compartment of the vehicle;
   an air bag contained in a folded state in said container, said air bag, when inflated, being expandable out of said container into the compartment of the vehicle;
   an inflater attached to said container for supplying gases to an inside of said air bag to inflate said air bag; and
   a module cover door covering the open face of said container and adapted to be opened into the inside of the vehicle, when said air bag is inflated, to allow said air bag to expand into the inside of the vehicle, said module cover door being generally flush with an instrument panel of the vehicle when said air bag system is attached to the vehicle,
   wherein the improvement resides:
   in that said module cover door is integrally formed with a plate-shaped mounted portion extending rearwardly from at least one side portion of said cover door and extends over an outer face of said container;
   in that said mounted portion is formed with slots extending inwardly so that it is attached to said container by mounting members fitted in inner portions of said slots; and
   in that, when said air bag begins its expansion, said module cover door is firstly guided by said slots to move into the compartment of the vehicle and then opened into the vehicle compartment.

2. An air bag system according to claim 1, wherein each of said slots is divided by a partition into a hole disposed nearer the vehicle compartment and an opposite hole, wherein said mounting members are inserted into the holes nearer the compartment, and wherein said partitions are broken, when said module cover door is moved into the compartment in accordance with expansion of said air bag, to allow movement of said module cover door.

3. An air bag system according to claim 1, wherein said module cover door has a slit extending generally horizontally for allowing said module cover door to open therealong when said module cover door is pushed at a back as said air bag expands.

4. An air bag system according to claim 1, wherein said mounted portion is disposed over at least one of upper and lower sides of said module cover door.

5. An air bag system according to claim 1, further comprising plates disposed at side portions of said module cover door and over side portions of said container and fixed on the sides of said container, said plates, when said module cover door moves forward into the compartment as said air bag expands, tearing from the module cover door.

6. An air bag system for a vehicle with a compartment, comprising:
   a container attached to the vehicle and having an open face oriented toward the compartment of the vehicle and side portions around the open face,
   an air bag retained in the container in a folded state, an inflater connected to the air bag to supply gases to the air bag, said air bag, when inflated, extending through the open face of the container and expanding into the compartment, a module cover door for covering the open face of the container, and having side portions and at least one mounted portion extending rearwardly from one of the side portions of the module cover door, said mounted portion having a plurality of elongated slots with inner portions extending in a direction toward and away from the compartment, and mounting members for attaching the module cover door to at least one side portion of the container, said mounting members, when the mounted portion of the module cover door is fastened to the side portion of the container, being located in the inner portions near the compartment and fastened to the container so that when the air bag starts to expand, the module cover door is guided along the elongated slots to move toward the compartment and then opens to allow the air bag to fully expand in the compartment.

* * * * *